United States Patent [19]
Jereb

[11] 3,810,056
[45] May 7, 1974

[54] NON-MAGNETIZED CERAMIC MAGNETIC ASSEMBLY

[75] Inventor: Richard F. Jereb, Lindenhurst, Ill.

[73] Assignee: Outboard Marine Corporation, Waukegan, Ill.

[22] Filed: Aug. 28, 1972

[21] Appl. No.: 283,948

[52] U.S. Cl. ............................... 335/302, 310/153
[51] Int. Cl. ............................................. H01f 7/02
[58] Field of Search ............ 335/302; 310/153, 154, 310/156

[56] References Cited
UNITED STATES PATENTS

| | | |
|---|---|---|
| 2,060,260 | 11/1936 | Spengler ........................ 335/302 X |
| 3,278,775 | 10/1966 | Eberline ............................. 310/153 |
| 3,470,408 | 9/1969 | Lewis et al. ..................... 310/156 X |
| 3,585,550 | 6/1971 | Dorsch et al. ..................... 335/302 |

Primary Examiner—George Harris
Attorney, Agent, or Firm—Michael, Best & Friedrich

[57] ABSTRACT

Disclosed herein is a ceramic magnet assembly including a non-magnetized ceramic magnet member having inner and outer concentric surfaces, together with a back iron member connected to the outer ceramic member surface by mechanically interlocking means and a pole shoe member connected to the inner ceramic member surface by mechanically interlocking means.

8 Claims, 3 Drawing Figures

PATENTED MAY 7 1974

3,810,056

Inventor
Richard F. Jereb
By Robert E. Clemency
Attorney

NON-MAGNETIZED CERAMIC MAGNETIC ASSEMBLY

BACKGROUND OF THE INVENTION

The invention relates generally to ceramic magnet assemblies for flywheels or other rotatable members which comprise components of a voltage generating means including a coil and a magnet which is rotatable relative to the coil and which is imbedded in the flywheel or other rotatable member. In general, in the past, such flywheels or other rotatable members have been made of non-ferrous materials, such as aluminum, and have often been die cast with a magnet assembly therein. Such magnet assemblies have included arcuately extending ceramic magnet members having a radially orientated magnetic length extending through the thickness of the material whereby, in effect, separate oppositely orientated magnets are provided at each of the ends of the ceramic material.

Such ceramic magnet members are initially manufactured without a charge, but are generally capable of being charged or magnetized and of subsequently retaining such magnetism. As already indicated, as compared to bar magnets in which the magnetic field runs for the length thereof (in the geometric sense) ceramic magnets are usually charged or magnetized so that the magnetic field runs in the direction of the width (which is nevertheless referred to as the magnetic length).

In order to complete a flux path between the oppositely orientated magnets in the ceramic magnet member and to provide machineable pole shoes, such assemblies have also included a ferrous or magnetically permeable back iron member and one or more ferrous or magnetic permeable pole shoe members assembled on opposite sides of the ceramic magnet member. During initial assembly and prior to casting, the ceramic magnet assembly is usually not fully charged or magnetized. After casting of the flywheel around the ceramic magnet assembly, the pole shoe member or members are usually machined so as to provide a surface which is truly concentric with the axis of flywheel rotation and so as to assist in establishing the desired air gap between the magnet assembly and the coil bearing armature. Such machining can also sub-divide a unitary pole shoe member into two separate and distinct pole shoes. After the machining operation, the ceramic magnet member is then usually fully charged or magnetized.

Arrangements have been employed in the past for maintaining the ceramic magnet member, the back iron member, and the pole shoe member or members in assembled relation prior to incorporation of the ceramic magnet assembly in a cast flywheel or rotatable member. Such arrangements have had various disadvantages and have included the use of certain cements which have operated to bind or hold together the assembly prior to and during the die casting operation and which have the capability of withstanding the high temperatures associated with casting. Another arrangement involves partial magnetization of the ceramic magnet member so as to magnetically maintain the various components in their desired positions. Partial charging of the ceramic magnet suffers from the serious disadvantage of complicating handling and production because of the tendency of the partial changed magnets to attract and to adhere to each other and be attracted to and to adhere to other ferrous articles while awaiting the die casting operation. Thus, it is particularly advantageous to avoid charging or magnetization of the ceramic magnet member until after the magnet assembly has been incorporated in the die cast part or article and the desired machining operations have occurred.

SUMMARY OF THE INVENTION

The invention disclosed herein provides an improved arrangement for pre-assembly of a ceramic magnet assembly prior to die casting. More specifically, the invention provides a ceramic magnet assembly including a ceramic magnet member, together with a pole shoe member and mechanically interlocking means on the ceramic magnet member and the pole shoe member for mechanically maintaining the ceramic magnet member and pole shoe member in assembled relation prior to and during a a casting operation.

Also in accordance with the invention, there is provided a back iron member and mechanically interlocking means securing the back iron member to the ceramic magnet member so as to maintain the back iron member and ceramic magnet member in assembled relation prior to and during a casting process.

More specifically in accordance with the invention, the disclosed mechanical interlocking means comprises one or more female sockets on one of the ceramic magnet member and the pole shoe member, together with one or more male prongs which extend from the other of the ceramic magnet member and the pole shoe member and which are respectively received in the female sockets. A similar arrangement is employed with respect to the back iron member and the ceramic magnet member. In the specifically illustrated construction, the back iron member and pole shoe member include one or more male prongs and the ceramic magnet member includes female sockets which receive the male prongs.

Also in accordance with a preferred embodiment of the invention, the sockets and the prongs are dimensioned so as to freely admit the prongs in the sockets under the worst allowable tolerance conditions and, in addition, the height of the ceramic magnet member of length of the female sockets is somewhat less than the height or length of the male prongs, whereby the prongs include portions which can be staked or otherwise deformed to prevent unwanted or unintentional disassembly of the back iron member or pole shoe member from the ceramic magnet member.

The invention also provides a method of manufacturing a ceramic magnet comprising the steps of forming a magnetizeable ceramic member with a first surface having a first portion adapted to be mechanically interlocked with another member, forming a pole member with a portion adapted to be mechanically interlocked with the first portion of the ceramic member, mechanically interlocking the pole shoe member to the ceramic member, casting a non-ferrous material around the assembly of the ceramic member with the pole shoe member, machining the pole shoe member, and magnetically charging the ceramic member.

One of the principal objects of the invention is the provision of a ceramic magnet assembly in which the various components are maintained in assembled relation by mechanical interlocks.

Another of the principal objects of the invention is the provision of a ceramic magnet assembly which solely comprises a ceramic magnet member, a back iron member, and one or more pole shoe members which are mechanically interlocked to the ceramic magnet member without the aid of magnetism or cement.

Still another of the principal objects of the invention is the provision of a ceramic magnet assembly for use in a die casting operation, which ceramic magnet assembly is retained in assembled relation without the aid of magnetism or cement.

Other objects and advantages of the invention will become known by reference to the following description and accompanying drawings.

DRAWINGS

GENERAL DESCRIPTION

Figure 1:
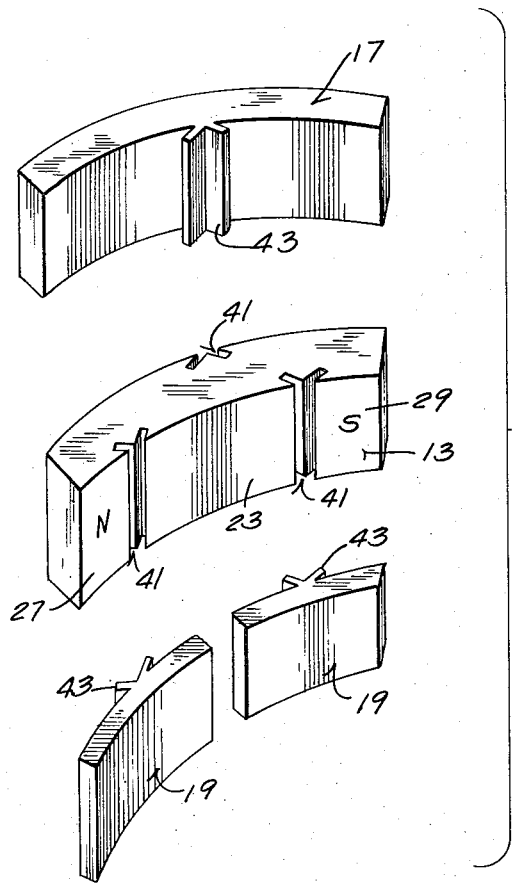
FIG. 1 is an exploded perspective view of a ceramic magnet assembly in accordance with the invention.
Figure 2:
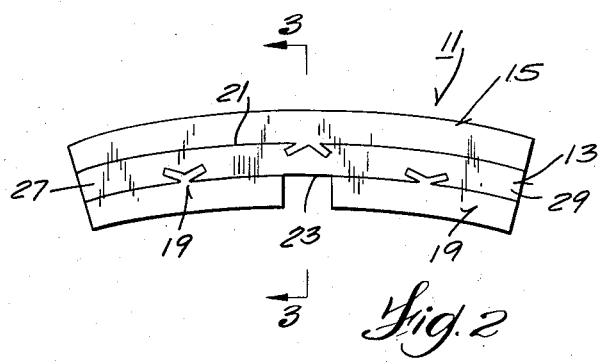
FIG. 2 is a top elevational view of the ceramic magnet assembly shown in exploded relation in FIG. 1.

Shown in FIG. 1 in an exploded view is a ceramic magnet assembly 11 which embodies various of the features of the invention and which includes a non-magnetized ceramic magnet member 13, a flux plate or back iron member 17, and a pair of generally identical pole shoe members 19.

While other shapes can be employed, the ceramic magnet member 13, as illustrated, is generally of arcuate form having inner and outer concentric arcuate faces or surfaces 21 and 23 which define therebetween the width of the ceramic magnet member 13 (and also the magnetic length of the magnets). The ceramic magnet member 13 has previously been cast in a wet or dry condition and, when in the green state, has been fired to produce the presently non-magnetized but subsequently magnetizeable ceramic material. When subsequently magnetized (after integration in the ceramic magnet assembly 11 and after being cast into a part such as a flywheel), the ceramic magnet member 13 will be charged or magnetized to provide, in effect, two oppositely orientated magnets separated by a magnetically "dead" area or void, with each of the magnets having a magnetic field orientated in the ceramic material in the radial direction (i.e., in the direction between the inner and outer faces 21 and 23) and thereby to provide, at one end 27 of the ceramic magnet member, a north pole at the inner face 21 and a south pole at the outer face 23 and, at the other end 29, a south pole at the inner face 21 and a north pole at the outer face 23.

The back iron member 17 and the pole shoe members 19 are constructed of ferrous material, i.e., magnetically permeable material. In addition, the pole shoe members 19 are desirably constructed of machineable ferrous material so as to permit machining after integration of the ceramic magnet assembly 11 into a cast article. In the preferred construction, the back iron member 17 and the pole shoe members 19 are of sintered iron construction, being fabricated from a magnetic grade of compacted iron which is relatively dense and malleable and, accordingly, is well suited for magnetic circuits.

While the illustrated construction includes two pole shoe members 19, the pole shoe members 19 could be initially integrated in a single pole shoe member and later separated or divided into two separate pole shoe members by machining occurring subsequent to casting.

In accordance with the invention, the back iron member 17 and the ceramic magnet member 13 are provided with cooperating mechanical interlocking means which serve to afford assembly therebetween and to retain the back iron member 17 and ceramic magnet member 13 in assembled relation until incorporated into a cast article. Various arrangements can be employed so long as the mechanical arrangement maintains the assembled components in assembled relation until incorporation of the ceramic magnet assembly in a cast article. In the specifically illustrated construction, the outer surface 23 of the ceramic magnet member 13 is provided with a V-shaped female notch or socket 41 which extends for the height of the ceramic magnet member 13 and which slideably receives a male V-shaped prong 43 extending from the back iron member 17.

The V-shaped socket 41 can be ground or cast into the ceramic magnet member 13 while the male prong 43 can be formed incident to casting of the sintered back iron member 17. Similar V-shaped male prongs 43 are provided on the sintered iron pole shoe members 19 and associated V-shaped female sockets 41 are provided on the inner face 21 of the ceramic magnet member 13 and receive the prongs 43 of the pole shoe members 19.

Figure 3:
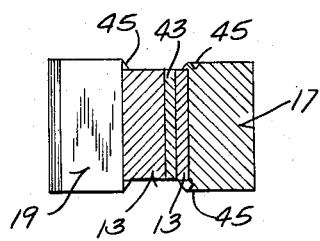
FIG. 3 is a sectional view taken generally along line 3—3 of FIG. 2 and showing the assembled relation of the back iron member and ceramic magnet member.

Means are provided for preventing disassembly of the back iron member 17 and the pole shoe members 19 from the ceramic magnet member 13. Various arrangements can be employed. In one preferred arrangement, the V-shaped sockets 41 are dimensioned so as to freely accept in a sliding fit the V-shaped male prongs 43. In addition, the prongs 43 are provided with a length of height greater than the length of height of the sockets 41 so that the prongs 43 can be arranged to extend somewhat beyond the upper and lower ends of the female sockets 41. Such extending prong ends can be staked or otherwise deformed, as shown at 45 in FIG. 3, to prevent disassembly of the prongs 43 from the sockets 41 of the ceramic magnet member 13.

Other arrangements are possible for preventing disassembly of the prongs 43 from the sockets 41. For example, a stop can be provided on either of the prongs 43 or the sockets 41 so that disassembly can be prevented by staking only at one end of the interlocking arrangement. Alternatively, a press fit can be provided between the male prong 43 and the female socket 41 wherein the prong 43 is designed to conform to the female socket 41 before exceeding the flexural strength of the ceramic magnet member 13. Still further, a press fit interlocking could be provided which extends for less than the height of the ceramic magnet member 13.

The ceramic magnet assembly 11 can thereafter be placed in a die and aluminum or other non-ferrous material cast around the assembly to thereafter prevent disassembly and to simultaneously imbed the ceramic magnet assembly 11 in the cast article.

After casting, the pole members 19 can be machined to obtain the desired finished arcuate surface and, if desired, to separate a unitary pole shoe member into two poles. Subsequently, the ceramic magnet member 13 can be charged to provide the before described magnets and to establish a magnetic flux path from one pole shoe through one end 27 of the ceramic magnet member 13, through the back iron member 17 to the other end 29 of the ceramic magnet member 13, and through the other end 29 of the ceramic magnet member 13 to the other pole shoe.

It is especially noted that the disclosed construction includes use only of components which also constitute portions of the desired magnetic circuit.

Various of the features of the invention are set forth in the following claims.

What is claimed is:

1. The assembly of a non-magnetized ceramic member having first and second surfaces, a back iron member, interlocking means on said first ceramic member surface and on said back iron member connecting said back iron member to said ceramic member, a pole shoe member, and interlocking means on said second ceramic member surface and on said pole shoe member connecting said pole shoe member to said magnetic member.

2. An assembly in accordance with claim 1 wherein said first and second ceramic member surfaces comprises inner and outer concentric surfaces.

3. An assembly in accordance with claim 1 wherein said interlocking means on said back iron and on said first ceramic member surface comprises a female socket in said ceramic member and a male prong on said back iron member received in said female socket.

4. An assembly in accordance with claim 3 wherein said back iron member is of sintered iron.

5. An assembly in accordance with claim 1 wherein said interlocking means on said pole shoe member and on said second ceramic member surface comprises a female socket in said ceramic member and a male prong on said pole shoe member received in said female socket.

6. An assembly in accordance with claim 5 wherein said pole shoe member is of machineable ferrous material.

7. An assembly in accordance with claim 5 wherein said pole shoe member is of sintered iron.

8. An assembly in accordance with claim 1 wherein said back iron member and said pole shoe member have a height greater than said ceramic member and wherein said interlocking means on said back iron member and said pole shoe member are, at least at one end thereof, enlarged to prevent relative movement between said ceramic member and said back iron and pole shoe members.

* * * * *